US010813197B2

(12) United States Patent
Reier et al.

(10) Patent No.: US 10,813,197 B2
(45) Date of Patent: Oct. 20, 2020

(54) WIRELESS SOLID STATE LIGHTING CONTROLLER

(71) Applicant: Cree, Inc., Durham, NC (US)

(72) Inventors: Bart Reier, Cary, NC (US); Daniel James Van Epps, Jr., Apex, NC (US); Yuan Fang, Durham, NC (US); David Power, Morrisville, NC (US); Leigh Herman, Rolesville, NC (US); Thomas Gordon, Cary, NC (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 421 days.

(21) Appl. No.: 15/483,453

(22) Filed: Apr. 10, 2017

(65) Prior Publication Data

US 2018/0295705 A1     Oct. 11, 2018

(51) Int. Cl.
*H05B 47/19*     (2020.01)
*G06F 3/0488*     (2013.01)

(52) U.S. Cl.
CPC ......... *H05B 47/19* (2020.01); *G06F 3/04883* (2013.01); *Y02B 20/346* (2013.01)

(58) Field of Classification Search
CPC .... H05B 37/02; H05B 37/0272; H05B 47/10; H05B 47/105; H05B 47/11; H05B 47/14; H05B 47/155; H05B 47/165; H05B 47/175; H05B 47/19; H05B 45/10; H05B 45/12; H05B 45/20; H05B 45/22; H05B 45/30;

(Continued)

(56) References Cited

U.S. PATENT DOCUMENTS

| 6,388,399 | B1 * | 5/2002 | Eckel | H05B 47/18 |
| | | | | 315/312 |
| 7,236,154 | B1 * | 6/2007 | Kerr | G09G 5/10 |
| | | | | 345/102 |

(Continued)

OTHER PUBLICATIONS

Amelech.com, "Wireless Control Smart Dimmer Light Touch Switch, View Smart Switch, Zigbee Light Switches Product Details from Shenzhen Amelech Technology", pp. 1-14; retrieved Apr. 7, 2017; retrieved from the internet: http://www.amelech.com/product/60549833305-801505066/zigbee_rgb_cct_sc_wireless_control_smart_dimmer_light_touch_switch.html.

(Continued)

*Primary Examiner* — Jason Crawford
(74) *Attorney, Agent, or Firm* — Coats & Bennett, PLLC

(57) ABSTRACT

A lighting controller comprises power circuitry, transmitter circuitry, a touch-sensitive panel, and processing circuitry. The power circuitry is configured to relay power from the lighting controller to a solid state lighting fixture wired to the lighting controller. The transmitter circuitry is configured to wirelessly exchange signals with the solid state lighting fixture. The touch-sensitive panel is configured to emit light and receive touch input from a user. The processing circuitry is electrically coupled to the power circuitry, the transmitter circuitry, and the touch-sensitive panel. The processing circuitry is configured to wirelessly control, via the transmitter circuitry, the attribute of light emitted by the solid state lighting fixture in accordance with the touch input received via the touch-sensitive panel and control the light emitted from the touch-sensitive panel to indicate the attribute as the attribute is wirelessly controlled.

24 Claims, 8 Drawing Sheets

(58) Field of Classification Search
CPC . G06F 3/01; G06F 3/016; G06F 3/041; G06F 3/0412; G06F 3/0414; G06F 3/0416
See application file for complete search history.

(56) References Cited

U.S. PATENT DOCUMENTS

| | | | | |
|---|---|---|---|---|
| 8,003,886 | B1* | 8/2011 | Rintz | H05B 45/10 174/66 |
| 9,389,769 | B1* | 7/2016 | O'Keeffe | G06F 1/3262 |
| 9,629,217 | B2* | 4/2017 | Kim | H05B 33/0863 |
| 9,678,571 | B1* | 6/2017 | Robert | G06F 3/016 |
| 10,375,807 | B1* | 8/2019 | Reilly | H05B 39/085 |
| 2010/0013649 | A1* | 1/2010 | Spira | G06F 3/041 340/664 |
| 2012/0242248 | A1* | 9/2012 | Drummond | H05B 47/10 315/297 |
| 2012/0320262 | A1* | 12/2012 | Chung | H05B 33/0863 348/370 |
| 2013/0030589 | A1* | 1/2013 | Pessina | H05B 47/19 700/295 |
| 2013/0135333 | A1* | 5/2013 | Chen | H05B 47/155 345/589 |
| 2013/0271004 | A1* | 10/2013 | Min | H05B 33/0842 315/112 |
| 2013/0307433 | A1* | 11/2013 | Lin | H05B 47/10 315/210 |
| 2014/0001846 | A1* | 1/2014 | Mosebrook | H02J 4/00 307/11 |
| 2014/0246991 | A1* | 9/2014 | Kim | H05B 47/19 315/292 |
| 2014/0277805 | A1* | 9/2014 | Browne, Jr. | H04W 4/70 700/295 |
| 2015/0015165 | A1* | 1/2015 | Engelen | H04B 10/1143 315/294 |
| 2015/0035443 | A1 | 2/2015 | Hill et al. | |
| 2015/0061841 | A1* | 3/2015 | Lee | G08C 17/02 340/12.5 |
| 2015/0145420 | A1* | 5/2015 | Simonian | H05B 47/105 315/154 |
| 2015/0185752 | A1* | 7/2015 | Bard | G05B 15/02 700/296 |
| 2015/0189724 | A1* | 7/2015 | Karc | G05F 1/66 315/149 |
| 2015/0230320 | A1* | 8/2015 | Gritti | H05B 37/0245 340/12.3 |
| 2015/0257238 | A1* | 9/2015 | Paradiso | H05B 37/0272 315/132 |
| 2015/0334811 | A1* | 11/2015 | So | H05B 37/0272 315/152 |
| 2015/0342011 | A1* | 11/2015 | Brochu | G05B 19/124 315/294 |
| 2016/0205748 | A1* | 7/2016 | Lashina | G08C 17/02 315/130 |
| 2016/0262235 | A1* | 9/2016 | Clymer | H04L 12/2816 |
| 2016/0270181 | A1* | 9/2016 | Yagi | H05B 33/0863 |
| 2016/0330819 | A1* | 11/2016 | Leadford | H05B 33/0863 |
| 2017/0064850 | A1* | 3/2017 | Blase | H05K 5/0004 |
| 2017/0117891 | A1* | 4/2017 | Lohbihler | G08C 17/02 |
| 2017/0142810 | A1* | 5/2017 | Cho | H05B 37/0272 |
| 2017/0150584 | A1* | 5/2017 | Motley | H05B 37/0272 |
| 2017/0163439 | A1* | 6/2017 | Bosua | H04L 12/2827 |
| 2017/0169702 | A1* | 6/2017 | Camden | H01Q 1/24 |
| 2017/0181241 | A1* | 6/2017 | Koo | H05B 33/0854 |
| 2017/0188438 | A1* | 6/2017 | Vollmer | H05B 37/0272 |
| 2018/0228003 | A1* | 8/2018 | O'Driscoll | H05B 47/105 |

OTHER PUBLICATIONS

Amelech.com, "110v, 220v, 230v ac wifi Wireless Control Wall Touch Light Switch, View wifi Light Switch, wifi Light Switch Product Details from Shenzhen Amelech Technology", pp. 1-12; retrieved Apr. 7, 2017; retrieved from the internet: http://www.amelech.com/product/60350224343-802701514/110v_220v_230v_ac_wifi_wireless_control_wall_touch_light_switch.html.

* cited by examiner

WIRELESS SOLID STATE LIGHTING CONTROLLER

BACKGROUND

Traditional lighting solutions commonly involve a wall switch that is directly wired to a lighting fixture and controls power to that lighting fixture by either relaying or interrupting power. Newer lighting fixtures include wireless features so that the lighting fixture can be illuminated or extinguished remotely.

BRIEF SUMMARY

Embodiments of the present disclosure generally relate to a lighting controller for wirelessly controlling solid state lighting, and more particularly to a lighting controller that emits light from a touch-sensitive panel to indicate an attribute of light emitted by a solid state lighting fixture as that attribute is wirelessly controlled by the lighting controller. Such embodiments include one or more methods, apparatus, systems, non-transitory computer readable media, and computer program products.

In particular, one or more embodiments include a lighting controller that comprises power circuitry, transmitter circuitry, a touch-sensitive panel, and processing circuitry. The power circuitry is configured to relay power from the lighting controller to a solid state lighting fixture wired to the lighting controller. The transmitter circuitry is configured to wirelessly exchange signals with the solid state lighting fixture. The touch-sensitive panel configured to emit light and receive touch input from a user. The processing circuitry is electrically coupled to the power circuitry, the transmitter circuitry, and the touch-sensitive panel. Further, the processing circuitry is configured to wirelessly control, via the transmitter, the attribute of light emitted by the solid state lighting fixture in accordance with the touch input received via the touch-sensitive panel, and control the light emitted from the touch-sensitive panel to indicate the attribute as the attribute is wirelessly controlled.

One or more other embodiments include a method of controlling solid state lighting. The method is implemented by a lighting controller. The method comprises relaying power from the lighting controller to a solid state lighting fixture wired to the lighting controller, wirelessly controlling an attribute of light emitted by the solid state lighting fixture in accordance with touch input received from a user via a touch-sensitive panel of the lighting controller; and emitting light from the touch-sensitive panel to indicate the attribute as the attribute is wirelessly controlled.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a lighting fixture 120, generally, as opposed to discussion of particular instances of lighting fixtures 120a, 120b).

DETAILED DESCRIPTION

Figure 1:
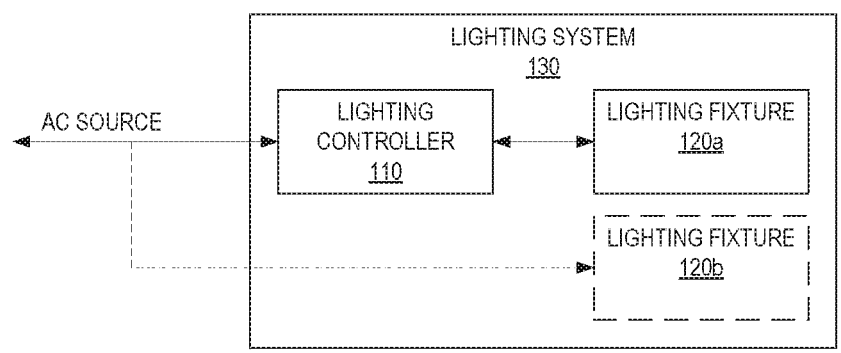
FIG. 1 is a schematic diagram of example lighting system according to one or more embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to at least one of each of the items in the list (e.g., at least one of A and at least one of B).

As will be described in detail below, particular aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

Turning now to the figures, FIG. 1 is a schematic diagram illustrating an example lighting system 130 as may be found, for example, in a home, apartment, office, and/or other location. The lighting system 130 includes a lighting controller 110 and a lighting fixture 120a that is wirelessly controlled by the lighting controller 110. As shown in FIG. 1, the lighting controller 110 accepts alternating current (AC) from an AC power source (e.g., an electrical utility company, solar panel, and/or gas-powered generator) and is configured to relay power to the lighting fixture 120a. According to embodiments, the lighting fixture 120a may be a solid state lighting fixture that uses one or more light-emitting diodes (LEDs) to emit light. In particular, such a solid state lighting fixture may include, for example, one or more semiconductor LEDs, one or more organic LEDs (OLEDs), and/or one or more polymer LEDs (PLEDs). Other embodiments may additionally or alternatively include other light emitting devices, such as one or more incandescent and/or fluorescent bulbs.

In some embodiments, the lighting system 130 may include one or more other lighting fixtures 120b that are also wirelessly controlled by the lighting controller 110. The lighting controller 110 may be wired to relay power to some, all, or none of these other lighting fixtures 120b. For example, as shown in FIG. 1, such a lighting fixture 120b may be wired to receive power from an AC power source in parallel with the lighting controller 110. According to one such example, the lighting controller 110 may be mounted to a wall of a given room and may wirelessly control lighting fixture 120a (to which the lighting controller 110 is wired to relay power) as well as lighting fixture 120b, which is wired to the same AC source as the lighting controller 110, but is in a different room therefrom.

According to other embodiments, the lighting fixture 120b may be wired to receive power from a different power source. For example, the lighting system 130 may span a large geographic area and/or be installed within a facility configured for electrical redundancy (not shown).

According to embodiments, the lighting system 130 or any part thereof (e.g., the lighting controller 110) may be part of an intelligent lighting network. For further information on intelligent lighting networks, please see U.S. patent application Ser. No. 14/588,762, filed Jan. 2, 2015; U.S. patent application Ser. No. 15/192,479, filed Jun. 24, 2016; and U.S. patent application Ser. No. 15/192,035, filed Jun. 24, 2016, which are incorporated herein by reference in their entireties.

Figure 2:
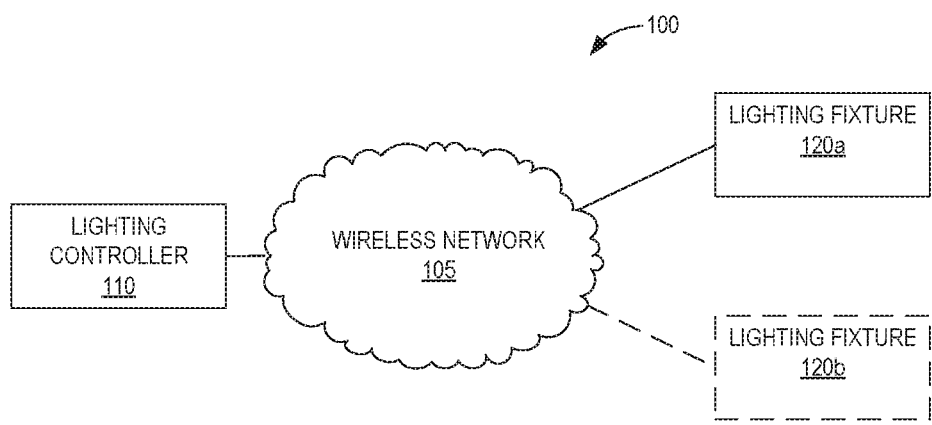
FIG. 2 is a block diagram of an example wireless networking environment according to one or more embodiments of the present disclosure.

To control the lighting fixtures 120a-b, the lighting controller 110 and lighting fixtures 120a-b may be included in a wireless network environment 100, such as is illustrated in the example of FIG. 2. As shown in FIG. 2, the wireless network environment 100 includes the lighting controller 110, the lighting fixtures 120a-b, and wireless network 105. The lighting fixtures 120a-b and lighting controller 110 are each communicatively coupled to the wireless network 105. In particular, the lighting controller 110 exchanges signals with the lighting fixtures 120a-b via the wireless network 105.

The wireless network 105 may include one or more physical devices and/or signaling mediums capable of exchanging communication signals between the lighting controller 110 and the lighting fixtures 120a-b. Examples of such a wireless network 105 include (but are not limited to) one or more of: one or more carrier frequencies; one or more wireless ad-hoc networks (such as a wireless mesh network); one or more wired and/or wireless local area networks (LANs); one or more cellular networks; one or more Internet Protocol-based networks; one or more Ethernet networks; one or more optical networks; the Internet (or a portion thereof); and/or one or more circuit switched networks. Such a wireless network 105 may comprise any number of networking devices intervening between the lighting controller 110 and the lighting fixtures 120a-b. Such intervening networking device may include, for example, one or more routers, one or more gateways, one or more switches, one or more hubs, one or more firewalls, and/or the like (not shown), any of which may be interconnected to one or more of any other by any wired (e.g., Ethernet) or wireless (e.g., 802.11ac) signal-carrying means.

Such signals exchanged within the wireless network environment 100 may include, for example, a control signal from the lighting controller 110 to one or more of the lighting fixtures 120a-b. Such a control signal from the lighting controller 110 may be configured to control one or more attributes of light (e.g., brightness and/or color temperature) emitted by one or more of the lighting fixtures 120a-b. The control signal from the lighting controller 110 may additionally or alternatively be configured to control one or more of the lighting fixtures 120a-b in other ways. For example, the control signal may additionally or alternatively control power and/or other fixture status, request status or diagnostic information, read from or write to memory components, configure network settings, and/or otherwise control one or more of the lighting fixtures 120a-b.

Signals exchanged within the example wireless networking environment 100 may also include, for example, acknowledgement, status, heartbeat, and/or other signals from any of the lighting fixtures 120a-b to the lighting controller 110. In some embodiments, the lighting fixtures may additionally or alternatively exchange signals with each other, e.g., to relay signals to and/or from the lighting controller 110.

Figure 3A:
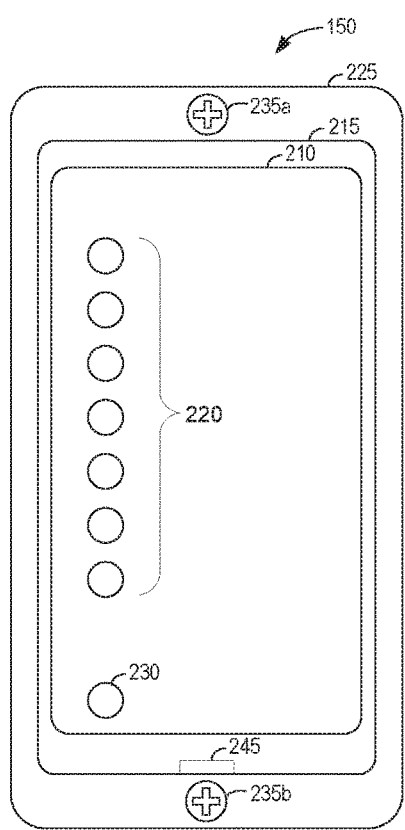
FIG. 3A is a front view of an arrangement according to one or more embodiments of the present disclosure.
Figure 3B:
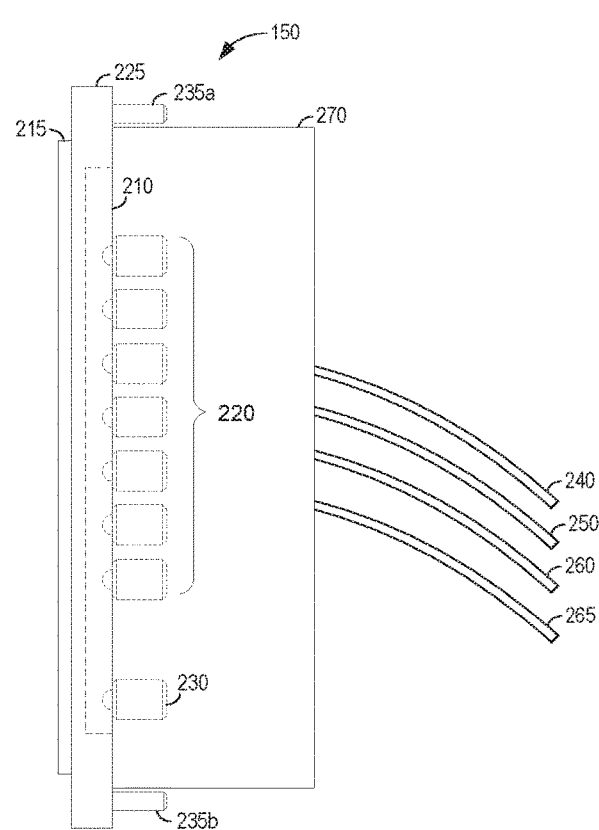
FIG. 3B is a right-side view of an arrangement according to one or more embodiments of the present disclosure.

One or more physical components of the lighting controller may be comprised in a physical arrangement that enables interaction with a user. An example of such an arrangement 150 is illustrated in FIGS. 3A and 3B, which depict a front view and a right-side view, respectively, of an example arrangement 150 for a lighting controller 110, according to one or more embodiments of the present disclosure. The particular arrangement 150 illustrated in FIGS. 3A and 3B includes a mounting flange 225, screws 235a-b, touch-sensitive panel 210, panel bezel 215, solid state status light 230, a series of solid state indicator lights 220, an air gap switch 245, a housing 270, a live wire 240, a ground wire 250, a neutral wire 260, and a load wire 265. Particular circuitry of the lighting controller 110 may be housed within the housing 270. As such circuitry will be discussed in further detail below, said circuitry is not shown in FIGS. 3A and 3B. The lighting controller 110 may comprise any or all of the elements shown in FIGS. 3A and 3B, according to particular embodiments.

In general, the lighting controller 110 may be configured to receive touch input from a user via the touch-sensitive panel 210, wirelessly control an attribute of light emitted by a lighting fixture 120 in accordance with the touch input, and control light emitted from the touch-sensitive panel 210. According to particular embodiments, the light emitted from the touch-sensitive panel 210 may be controlled to indicate the attribute as the attribute is wirelessly controlled. The light emitted from the touch-sensitive panel 210 may additionally or alternatively be controlled to, e.g., operate as mood lighting, ambient lighting, a nightlight, and/or otherwise illuminate the area around the lighting controller 110. Particular embodiments of the lighting controller 110 may also update which of the indicator lights in the series of solid state indicator lights 220 are illuminated and/or extinguished, as will be discussed in further detail below.

To facilitate access to such features of the lighting controller 110, the arrangement may be mounted to a wall or other surface via the mounting flange 225. According to this example, the mounting flange 225 has a top hole and bottom hole (not shown) through its proximal surface through which screws 235a-b pass, respectively, such that the screws 235a-b may, for example, engage with corresponding threaded channels on the distal side of the mounting flange 225 in a standard size one-gang electrical box, other electrical box (e.g., a multi-gang electrical box), or thread into a surface (e.g., drywall, wooden stud).

As shown, panel bezel 215 extends proximally from the mounting flange 225, houses air gap switch 245, and frames the touch-sensitive panel 210. The touch-sensitive panel 210 comprises a transparent or translucent touch-sensitive surface that covers the series of solid state indicator lights 220 and the solid state status light 230 which are each housed behind the touch-sensitive panel 210 and within the housing 270. The housing 270 extends distally from the mounting flange 225 and forms a hollow compartment (not shown) in which circuitry of the lighting fixture 110 may be housed, as mentioned above. In particular, the line wire 240, ground wire 250, neutral wire 260, and load wire 265 may be connected to power circuitry (not shown) of the lighting controller 110 through an aperture (not shown) in the distal surface of the housing 270, e.g., so that the lighting controller 110 may be wired to a power source as previously described.

The series of solid state indicator lights 220 in this example is arranged along a vertical axis of the lighting controller 110 such that a proximally-facing light emitting end of each of the indicator lights in the series 220 may be viewed through the touch-sensitive panel 210 from the front. As will be discussed further below, the series of solid state indicator lights 220 are configured to operate in conjunction to provide information to a user. The solid state status light 230 is also positioned along the vertical axis of, and spaced away from, the series of solid state indicator lights 220, such that a proximally-facing light emitting end of the solid state status light 230 may be viewed through the touch-sensitive panel 210 from the front. The solid state status light 230 may indicate, for example, whether a pairing status, a power status, and/or other status of the lighting controller 110. For example, the solid state status light 230 may indicate whether the lighting controller 110 is paired with a lighting fixture 120, e.g., via BLUETOOTH. Other embodiments may include other solid state status lights 230 (not shown).

The air gap switch 245 may be arranged such that, when the air gap switch 245 is withdrawn proximally from the bezel 215, wholly or in part, a physical spacing is created between the power source and a lighting fixture 120 to which the lighting controller 110 is configured to relay power, thereby interrupting power to the lighting controller 110 and/or that lighting fixture 120. Correspondingly, insertion of the air gap switch 245, wholly or in part, may close the physical spacing, thereby restoring power. According to embodiments, the air gap switch 245 may be discretely located to discourage careless and/or accidental actuation by a user that would cause a wired lighting fixture 120a to lose power, be removed from the wireless network 105, lose its lighting configuration, and/or have other effects that may be unintended. Although FIG. 3A illustrates the air gap switch 245 as being mounted in the bezel, 215, other embodiments may include the air gap switch 245 mounted elsewhere in the arrangement 150, e.g., in the mounting flange 225.

FIGS. 3A and 3B illustrate one of many example embodiments of an arrangement 150 for a lighting controller 110 that may receive input from, and present output to, a user. Other embodiments of the lighting controller 110 may vary in one or more ways from the example embodiment illustrated in FIGS. 3A and 3B. For example, according to the example of FIGS. 3A and 3B, the series of solid state indicator lights 220 comprises seven solid state indicator lights, whereas other embodiments may include fewer or additional indicator lights, any or all of which may be positioned along any axis or curve.

As another example, the mounting flange 225 and housing 270 may be formed as a unitary member of the lighting controller 110 according to the embodiment of FIGS. 3A and 3B, with the panel bezel 215 being separately formed to snap into the interior surface of the housing 270 over an edge of the touch-sensitive panel 210. Other embodiments may include a mounting flange 225 and housing 270 that are formed as separate interlocking members.

As another example, although the embodiment illustrated in FIGS. 3A and 3B includes two screws 235a-b and corresponding holes in the mounting flange 225, other embodiments may include additional or fewer screws 235 and/or holes in the mounting flange 235a, e.g., for mounting into a multi-gang electrical box.

Further, other embodiments may omit one or more of the mounting flange 225, screws 235a-b, panel bezel 215, housing 270, air gap switch 245, and/or ground wire 250. In some such embodiments, the lighting controller 110 may be designed to couple with one or more such omitted components as may be provided, e.g., by one or more external devices, and/or one or more mounting kits/brackets.

As briefly mentioned above, the lighting controller 110 may be comprise circuitry configured to accept input from a user, provide output to the user, and/or exchange signals with one or more lighting fixtures 120. An example of such circuitry is illustrated in the example block diagram of FIG. 4. The example circuitry of FIG. 4 comprises processing circuitry 710 and interface circuitry 730. The processing circuitry 710 is communicatively coupled to the interface circuitry 730, e.g., via one or more buses. Particular embodiments may further include memory circuitry 720, which may be communicatively coupled to the processing circuitry 710 (e.g., system random-access memory (RAM)) and/or may be comprised in the processing circuitry 710 (e.g., cache memory).

The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable control program 760 in the memory circuitry 720.

The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, EEPROM, flash memory, solid state drive, etc.), removable storage devices (e.g., Secure Digital (SD) card, miniSD card, microSD card, memory stick, thumb-drive, USB flash drive, ROM cartridge), fixed drive or the like, wholly or in any combination.

The interface circuitry 730 may be a controller hub configured to control the input and output (I/O) data paths of the computing device 110. Such I/O data paths may include data paths for exchanging signals over a communications network 105 and data paths for exchanging signals with a user. For example, the interface circuitry 730 may comprise a transceiver configured to send and receive communication signals over, e.g., the wireless network 105 (not shown in FIG. 3). The interface circuitry 730 may also comprise one or more of a series of solid state indicator lights 220, solid state status light 230, haptic feedback actuator 340, graphics adapter, display port, video bus, touchscreen display, graphical processing unit (GPU), Liquid Crystal Display (LCD), and Light Emitting Diode (LED) display, for presenting visual information to a user. The interface circuitry 730 may additionally or alternatively comprise one or more of a pointing device (e.g., a mouse, stylus, touchpad, trackball, pointing stick, joystick), touch-sensitive panel 210, microphone for speech input, motion sensor (e.g. for detecting the presence of a user), proximity sensor (e.g., for detecting the proximity of a user), optical sensor (e.g., for optical recognition of movement gestures), keyboard/keypad for entering text, numbers, and/or symbols.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network 105) and/or input circuitry 750 (e.g., receiver circuitry configured to receive communication signals over the communications network 105). Similarly, the output circuitry 740 may comprise light emitting surface of a touch-sensitive panel 210, whereas the input circuitry 750 may comprise a touch-sensing surface (e.g., resistive or capacitive) of the touch-sensitive panel 210. Other examples, permutations, and arrangements of the above and their equivalents will be readily apparent to those of ordinary skill.

Figure 4:
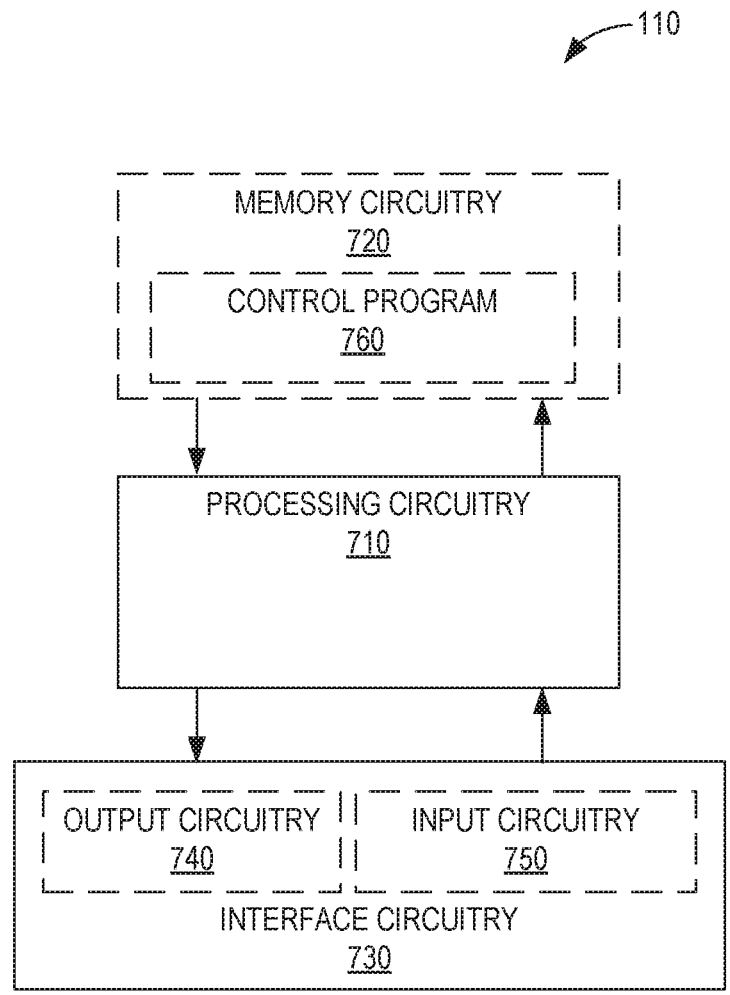
FIG. 4 is a block diagram of example circuitry of a lighting controller according to one or more embodiments of the present disclosure.
Figure 5:
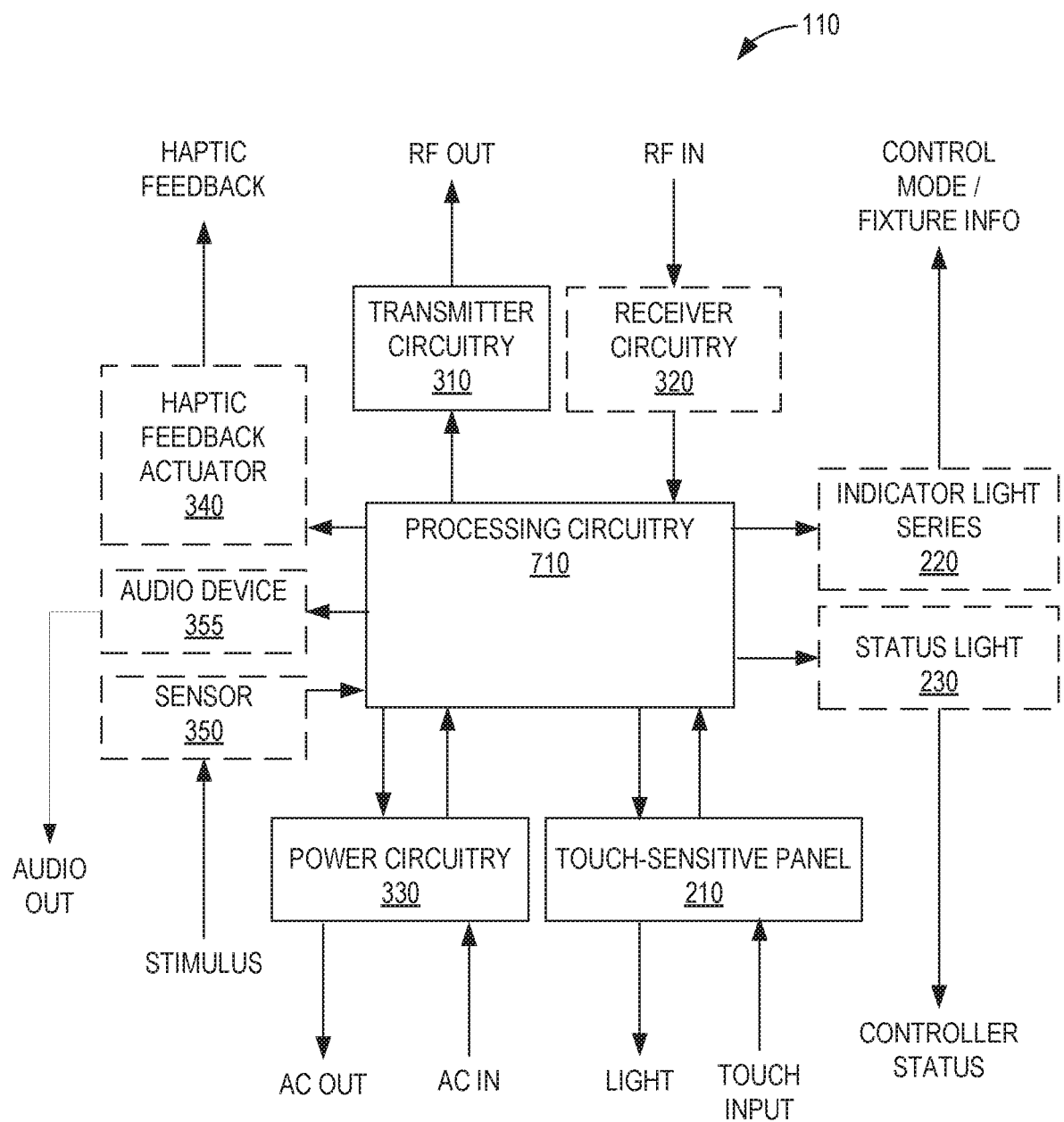
FIG. 5 is a more detailed block diagram of example circuitry of a lighting controller according to one or more embodiments of the present disclosure.

For example, the circuitry illustrated in FIG. 4 may be implemented according to the example of FIG. 5. According to this example, the lighting controller 110 comprises processing circuitry 710, transmitter circuitry 310, power circuitry 330, and a touch-sensitive panel 210. In particular, the processing circuitry 710 is electrically coupled to the power circuitry 330, the transmitter circuitry 310, and the touch-sensitive panel 210. In some embodiments, the lighting controller 110 further comprises receiver circuitry 320, a haptic feedback actuator 340, sensor 350, audio device 355, indicator lights 220 and/or status light 230, each of which may be coupled to the processing circuitry 710.

The power circuitry 330 is configured to relay power from the lighting controller 110 to a solid state lighting fixture 120 wired to the lighting controller 110. In some embodiments, the power relayed from the power circuitry 330 may be received from a power source as described above. In some embodiments, the power circuitry 330 may be configured to permit interruption, e.g., responsive to a user withdrawing the air gap switch 245 described above. For example, the power circuitry 330 may permit a physical spacing to be created by manually actuation of the air gap switch 245 to alternatively cut and supply power to the lighting controller 110 and/or one or more lighting fixtures 120 to which the lighting controller 110 is wired.

In some embodiments that include the status light 230, the lighting controller 110 may be configured to illuminate the status light 230 when the lighting controller 110 is powered and/or relaying power to one or more lighting fixtures 120, and extinguish the status light 230 when not powered and/or relaying power to the one or more lighting fixtures 120. Other embodiments may illuminate and extinguish the status light 230 to indicate other status conditions (e.g., to indicate that the lighting controller is connected to the wireless network 105).

The transmitter circuitry 310 is configured to wirelessly exchange signals with a solid state lighting fixture 120, e.g., via a radio frequency carrier. In particular, the transmitter circuitry 310 may, for example, be configured to transmit a control signal over a wireless medium to one or more solid state lighting fixtures 120 via an 802.11, 802.15, Near-Field Communication (NFC), cellular, and/or infrared wireless communications protocol. In some embodiments, the lighting controller further comprises receiver circuitry 320 (e.g., comprised along with the transmitter circuitry 310 in transceiver circuitry, not shown) to receive signals from the one or more solid state lighting fixtures 120. As discussed above, such signals may include acknowledgement, status, heartbeat, and/or other signals from any of the lighting fixtures 120a-b.

The lighting controller 110 may be configured to emit light. To emit light, the touch-sensitive panel 210 may include a light source (e.g., indicator lights 220, status light 230, and/or other light source). According to particular embodiments, the light source comprises the touch-sensitive panel 210 (e.g., in addition to, or instead of, the light sources discussed above). The touch-sensitive panel 210 is further configured to receive touch input from a user. To receive touch input, the touch-sensitive panel may, for example, include resistive, capacitive, acoustic, and/or optical touch-sensing circuitry.

According to embodiments in which the touch-sensitive panel 210 emits light, the touch-sensitive panel 210 may include the light source (e.g., indicator lights 220, status light 230, and/or other light source) behind a transparent or translucent front surface of the touch-sensitive panel 210 and/or be optically-connected to the light source via, e.g., by direct contact and/or an optical waveguide, such as a light tube. In particular, the touch-sensitive panel 210 may be controlled (e.g., via the processing circuitry 710) to emit light to indicate an attribute of light emitted by a solid state lighting fixture 120 controlled by the lighting controller 110. Such an attribute may be, e.g., brightness and/or color temperature, among others.

In particular embodiments, as the lighting controller 110 wirelessly controls the brightness and/or color temperature of a solid state lighting fixture 120, the brightness and/or color temperature of the touch-sensitive panel 210 may be correspondingly controlled. For example, responsive to a given touch input being received from a user via the touch-sensitive panel 210, the processing circuitry 710 may be configured to wirelessly set a particular brightness level (e.g., 50% brightness) within a range of brightness levels supported by the lighting fixture(s) 120 being wirelessly controlled (e.g., a range spanning a minimum brightness level and a maximum brightness level). One example of such a range may be from one to one hundred percent brightness. Another example of such a range may be from 10 lumens to 60 lumens. Other brightness ranges may be supported in other embodiments according to the particular lighting fixture(s) 120 being wirelessly controlled by the lighting controller 110.

As another example, the control signals from the lighting controller 110 may additionally or alternatively be configured to control a color temperature attribute of light emitted by one or more of the lighting fixtures 120a-b. In particular, the color temperature attribute may be wirelessly set to a particular color temperature level (e.g., 4000K) within a range of color temperature levels supported by the lighting fixture(s) 120 being wirelessly controlled (e.g., a range spanning a minimum warmth to a maximum warmth). One example of such a range may be from 6500K to 1900K. Another example of such a range may be from a preset daylight level (e.g., preset to between 5000K and 6500K) to a preset warm white level (e.g., present to between 1900K and 3000K). Other color temperature ranges may be supported in other embodiments according to the particular lighting fixture(s) 120 being wirelessly controlled by the lighting controller 110.

The touch-sensitive panel 210 may additionally or alternatively be controlled to emit light responsive to a stimulus detected by sensor 350 (i.e., in one or more embodiments of the lighting controller 110 that include the sensor 350). For example, the sensor 350 may be a non-touch based presence, proximity, and/or motion sensor configured to detect the user. The sensor 350 may additionally or alternatively be an ambient light sensor configured to detect the presence or absence of ambient light. The processing circuitry 710 may controlling the touch-sensitive panel 210 to emit light responsive to the detection of a stimulus by the sensor 350.

The processing circuitry 710 may additionally or alternatively be configured to wirelessly control, via the transmitter circuitry 310, an attribute of light emitted by a solid state lighting fixture 120 in accordance with the touch input received via the touch-sensitive panel 210. For example, the processing circuitry 710 may be configured to set the brightness attribute of the lighting fixture 120 to 50% brightness responsive to a user sliding a finger across a surface of the touch-sensitive panel 210. In particular, the processing circuitry 710 may be configured to determine, within a range of supported configuration values, a configuration value (e.g., a value of 50% brightness) to indicate via a control signal based on a length over which the sliding touch input was received. Further, the processing circuitry 710 may be further configured to control the light emitted from the touch-sensitive panel 210 to indicate the attribute of light emitted by the solid state lighting fixture 120 as that attribute is wirelessly controlled.

For example, the processing circuitry 710 may be configured to determine a brightness value of 50% brightness based on a length across the front surface of the touch-sensitive panel 210 over which the touch input is received. As one example, the processing circuitry 710 may determine the 50% brightness value in response to receiving a sliding touch input over half the vertical length of the touch-sensitive panel 210, and in response, transmit a control signal via the transmitter circuitry 310 indicating that 50% brightness to a lighting fixture 120. Various particular embodiments may determine such a configuration value based on the length over which the sliding touch input is received according to a linear, polynomial, exponential, logarithmic, formulaic, or other relationship between that length and a controlled attribute of light emitted by the controlled lighting fixture 120.

According to particular embodiments in which the lighting controller 120 includes the audio device 355 and/or haptic feedback actuator 340, the processing circuitry 710 may be further configured to, responsive to determining that the configuration value is equal to a value at either end of the range of supported configuration values, provide feedback to the user using the audio device 355 and/or haptic feedback actuator 340. This feedback may, for example, serve to indicate to the user that a given threshold for controlling the controlled attribute has been reached. The processing circuitry 710 may be configured to output this feedback to the user via audio device 355 in the form of audio (e.g., buzzes, chirps, beeps, tones, speech, and/or music). The processing circuitry 710 may additionally or alternatively be configured to output this feedback to the user via haptic feedback actuator 340 in the form of vibration. In an embodiment, the user may be able to feel such vibration through the touch-sensitive panel 210, for example.

The processing circuitry 710 may be additionally or alternatively be configured to interpret the touch input received from the user via the touch-sensitive panel 210, based on which of a brightness control mode and a color temperature control mode of the lighting controller 110 is active, to determine the control signal for wirelessly controlling a brightness attribute or a color temperature attribute of light emitted by a solid state lighting fixture 120. In some such embodiments, the processing circuitry may be further configured to toggle between the brightness and color temperature control modes responsive to touch input from the user (e.g., a double-tap of the touch-sensitive panel 210 and/or pressing the touch-sensitive panel 210 longer than a threshold duration). Accordingly, to determine the configuration value within the range of supported configuration values, the processing circuitry 710 may be configured to, responsive to the brightness control mode being active, determine a brightness value between minimum and maximum supported brightness values, and responsive to the color temperature control mode being active, determine a color temperature value between minimum and maximum supported warmth values.

Figure 6:
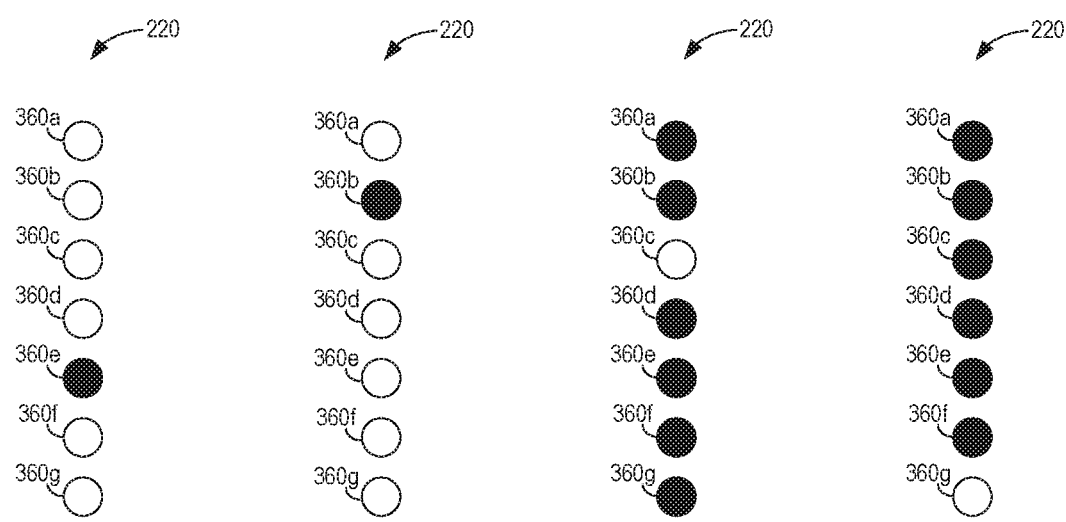
FIGS. 6A-6D illustrate an example series of solid state indicator lights of a lighting controller in respective states according to one or more embodiments of the present disclosure.

To indicate which of the brightness and color temperature control modes is active, the processing circuitry 710 may be further configured to control the series of solid state indicator lights 220 as shown in FIGS. 6A-6D. According to the examples shown in FIGS. 6A-6D, the series of solid state indicator lights 220 comprises seven indicator lights 360a-g, each of which may be illuminated or extinguished (though other embodiments may include additional or fewer indicator lights 360). According to these examples, the active control mode of the lighting controller 110 is visually indicated by controlling whether a majority of the indicator lights 360a-g is illuminated or extinguished. In particular, FIGS. 6A and 6B illustrate an example in which a first control mode (e.g., the brightness control mode) of the lighting controller 110 is indicated as active due to a majority of the indicator lights 360a-g being extinguished, whereas FIGS. 6C and 6D illustrate an example in which a second control mode (e.g., the color temperature control mode) of the lighting controller 110 is indicated as active due to a majority of the indicator lights 360a-g being illuminated.

The series of solid state indicator lights 220 may also be controlled (e.g., by the processing circuitry 710) to visually indicate other information. For example, while the illuminated or extinguished status of a majority of the indicator lights 360 may visually indicate which control mode is active, a remainder of the indicator lights 360 not in the majority may visually indicate the attribute of light emitted by the solid state lighting fixture 120 being controlled in the currently active control mode.

For example, as shown in the example of FIG. 6A, the majority of the indicator lights 360a-d, 360f-g are extinguished (e.g., thereby indicating that a brightness control mode is active), whereas a remaining indicator light 360e is illuminated. The remaining indicator light 360e is the third indicator light 360 from the bottom of seven total. Accordingly, the remaining indicator light 360e may visually indicate that the light emitted by lighting fixture 120 is approximately three-sevenths as bright as the maximum brightness supported by the lighting fixture 120. Additionally or alternatively, the remaining indicator light 360e may visually indicate that the light emitted by the lighting fixture 120 is set to a third-lowest brightness value out of seven supported brightness values. In general, the remaining indicator light 360e may visually indicate the attribute of the light emitted by the lighting fixture 120 relative to a supported range for the attribute. Although only one remaining indicator light 360e is illustrated in this example, other embodiments may include more than one indicator light 360 in the non-majority remainder of indicator lights.

Responsive to receiving touch input via the touch-sensitive panel 210, the remaining indicator light 360e may be changed. For example, the user may slide a finger upwards against a surface of the touch-sensitive panel 210 while the brightness control mode is active to increase the brightness of the solid state lighting fixture 120 and the processing circuitry 710 may be configured to select a different indicator light 360b closer to the top of the series 220 to be in the remainder in response (as shown in FIG. 6B). Additionally or alternatively, the brightness of the indicator light 360b may be correspondingly increased, e.g., such that the touch-sensitive panel 210 emits light that visually corresponds to the light emitted from the controlled solid state lighting fixture 120.

The processing circuitry 710 may be configured to change which control mode is active responsive to further touch input received via the touch-sensitive panel 210. For example, responsive to receiving a double-tap via the touch-sensitive panel 210, the processing circuitry 710 may be configured to activate a color temperature control mode of the lighting controller 110, and update the series of indicator lights 220 to visually indicate the newly-active control mode, as shown in FIG. 6C. As shown in the example of FIG. 6C, the majority of the indicator lights 360a-b, 360d-g are illuminated (e.g., thereby indicating that the color temperature control mode is active), whereas the remainder of the indicator lights 360c is extinguished. The remainder of the indicator lights includes the third indicator light 360c from the top, thereby visually indicating that the light emitted by lighting fixture 120 is slightly more than 50% as warm as the maximum warmth supported by the lighting fixture 120. Responsive to the user sliding a finger fully downwards against the surface of the touch-sensitive panel 210 while the color temperature control mode is active (e.g., to decrease the warmth of the light emitted by the solid state lighting fixture 120) the processing circuitry 710 may select indicator light 360g at the bottom of the series 220 to be in the remainder, as shown in FIG. 6D. Additionally or alternatively, the warmth of the illuminated indicator lights 360a-f may be correspondingly decreased, e.g., such that the touch-sensitive panel 210 emits light that visually corresponds to the light emitted from the controlled solid state lighting fixture 120.

Although the series of solid state indicator lights 220 includes seven indicator lights 360a-g in the examples of FIGS. 6A-6D, other embodiments may include additional or fewer indicator lights 360. Further, although embodiments were described above in which a brightness control mode was indicated as active by a majority of the indicator lights 360a-g being extinguished, other embodiments may indicate that the brightness control mode is active by a majority of the indicator lights 360a-g being illuminated. In addition, although embodiments were described above in which a color temperature control mode was indicated as active by a majority of the indicator lights 360a-g being illuminated, other embodiments may indicate that the brightness control mode is active by a majority of the indicator lights 360a-g being extinguished.

Further, although the indicator lights 360a-g are shown in FIGS. 6A-6D to be arranged along a vertical axis, other embodiments may include indicator lights 360 arranged along a different axis (e.g., a horizontal axis) or along a curve. Yet further embodiments may include a different series of solid state indicator lights 220, each of which may be separately arranged, and each of which visually indicating respective attributes of the light emitted by the solid state lighting fixture 120 being wirelessly controlled.

Although various embodiments above were discussed in terms of wirelessly controlling, for example, a solid state lighting fixture 120a to which the lighting controller 110 is wired to relay power, the processing circuitry 710 may be additionally or alternatively be configured to wirelessly control a different solid state lighting fixture 120b to which the lighting controller 110 is not wired to provide power according to one or more embodiments. In particular, responsive to a user selecting a different lighting fixture 120b to wirelessly control, the processing circuitry 710 may be configured to update the light emitted from the touch-sensitive panel 210 to indicate a brightness and color temperature of the different lighting fixture 120b as the different lighting fixture 120b is wirelessly controlled by the lighting controller 110. The processing circuitry 710 may further be configured to update which of the indicator lights 360 are illuminated and which are extinguished in accordance with the light emitted by the different lighting fixture 120b, e.g., in a manner consistent with the examples illustrated in FIGS. 6A-6D.

Figure 7:
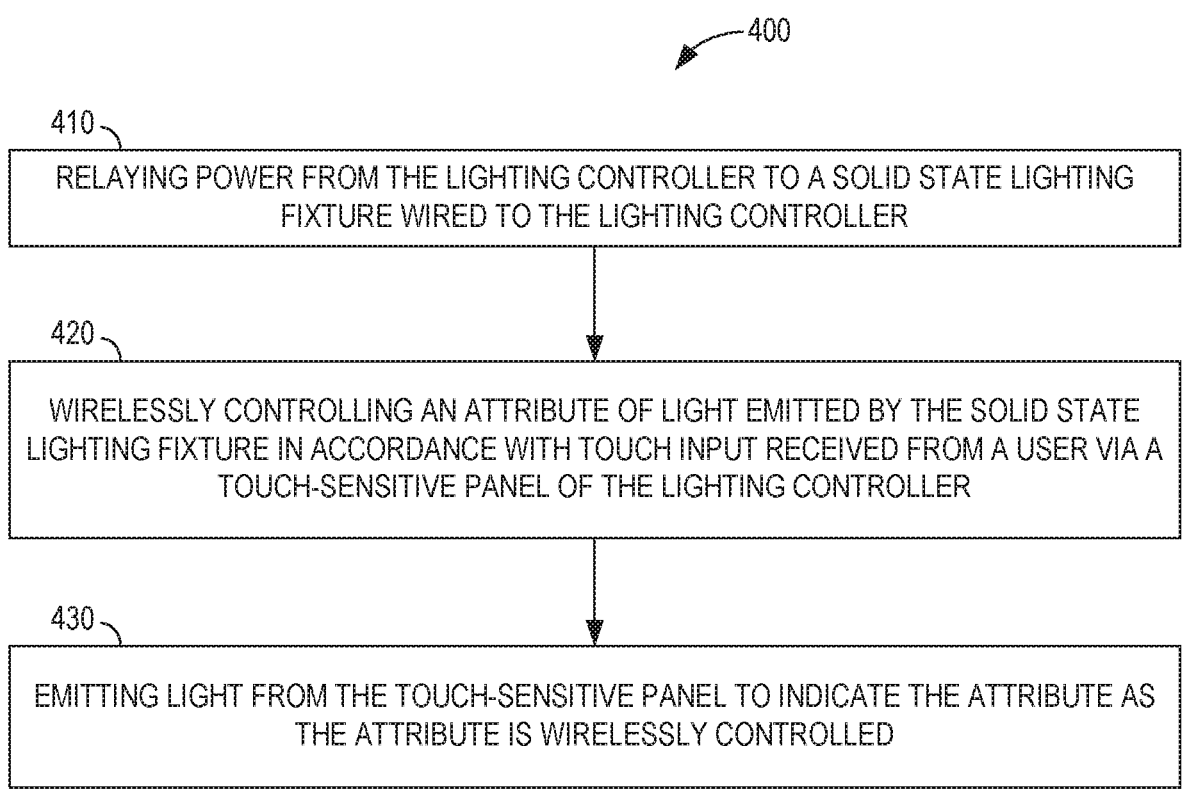
FIG. 7 is a flow diagram of an example method according to one or more embodiments of the present disclosure.

In view of the above, FIG. 7 illustrates an example method 400 of controlling solid state lighting. The example method 400 may be implemented by a lighting controller 110, according to one or more embodiments of the present disclosure. The example method 400 comprises relaying power from the lighting controller 110 to a solid state lighting fixture 120a wired to the lighting controller 110 (block 410), wirelessly controlling an attribute of light emitted by the solid state lighting fixture 120a in accordance with touch input received from a user via a touch-sensitive panel 210 of the lighting controller 110 (block 420), and emitting light from the touch-sensitive panel 210 to indicate the attribute as the attribute is wirelessly controlled (block 430). Other embodiments of the present disclosure include methods that include performing any other the functions described above.

Figure 8:
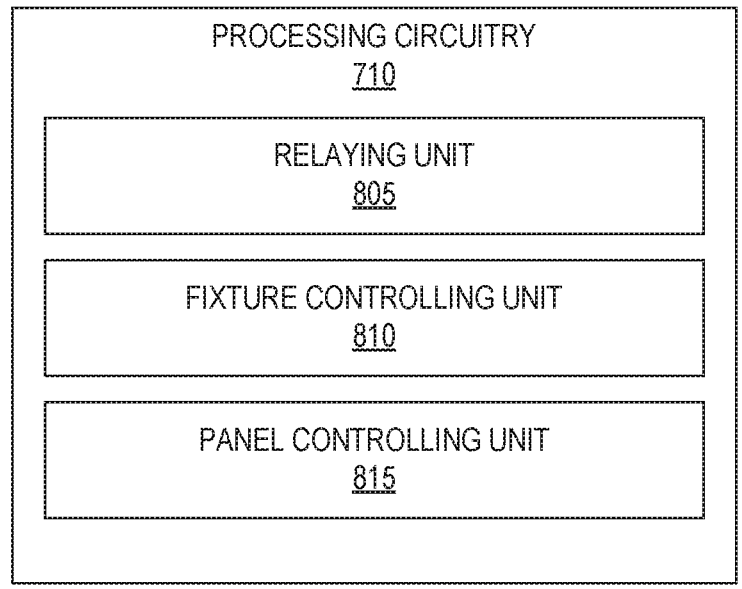
FIG. 8 is a block diagram of example hardware units of processing circuitry according to one or more embodiments of the present disclosure.

Other embodiments of the present disclosure include the example processing circuitry 710 of a lighting controller 110 as illustrated in FIG. 8. The processing circuitry 710 comprises a plurality of communicatively coupled physical units. In particular, the processing circuitry 710 comprises a relaying unit 805, a fixture controlling unit 810 and a panel controlling unit 815. The relaying unit 805 is configured to relay power from the lighting controller 110 to a solid state lighting fixture 120a wired to the lighting controller. The fixture controlling unit 810 is configured to wirelessly control an attribute of light emitted by the solid state lighting fixture 120a in accordance with touch input received from a user via a touch-sensitive panel 210 of the lighting controller 110. The panel controlling unit 815 is configured to emitting light from the touch-sensitive panel 210 to indicate the attribute as the attribute is wirelessly controlled.

Figure 9:
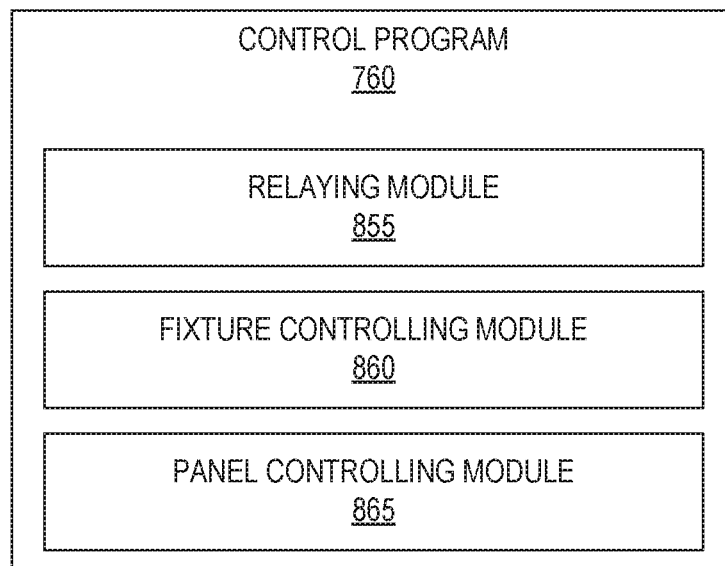
FIG. 9 is a block diagram of example software modules of a control program according to one or more embodiments of the present disclosure.

Other embodiments of the present disclosure include the example control program 760 of a lighting controller 110, as illustrated in FIG. 9. The control program 760 of FIG. 8 comprises a plurality of software modules. In particular, this control program 760 comprises a relaying module 805, a fixture controlling module 810 and a panel controlling module 815. The relaying module 805 is configured to relay power from the lighting controller 110 to a solid state lighting fixture 120a wired to the lighting controller. The fixture controlling module 810 is configured to wirelessly control an attribute of light emitted by the solid state lighting fixture 120a in accordance with touch input received from a user via a touch-sensitive panel 210 of the lighting controller 110. The panel controlling module 815 is configured to emitting light from the touch-sensitive panel 210 to indicate the attribute as the attribute is wirelessly controlled.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuits of various embodiments of the router may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, may depend on system-level requirements that are outside the scope of the present disclosure. Accordingly, further details with respect to more specific hardware implementations are not provided herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A lighting controller comprising:
    power circuitry configured to relay power from the lighting controller to a solid state lighting fixture wired to the lighting controller;
    transmitter circuitry configured to wirelessly exchange signals with the solid state lighting fixture;
    a touch-sensitive panel configured to emit light and receive touch input from a user;
    a series of solid state indicator lights;
    processing circuitry electrically coupled to the power circuitry, the transmitter circuitry, and the touch-sensitive panel, wherein the processing circuitry is configured to:
        control the series of solid state indicator lights to visually indicate which of a brightness control mode and a color temperature control mode is active;
        interpret the touch input received from the user via the touch-sensitive panel, based on which of the brightness control mode and the color temperature control mode of the lighting controller is active, to determine a control signal for wirelessly controlling an attribute of light emitted by the solid state lighting fixture, the attribute being a brightness attribute or a color temperature attribute;

using the control signal to wirelessly control, via the transmitter circuitry, the attribute of the light emitted by the solid state lighting fixture in accordance with the touch input received via the touch-sensitive panel; and control the light emitted from the touch-sensitive panel to illuminate an area around the lighting controller and correspondingly indicate the attribute as the attribute is wirelessly controlled.

2. The lighting controller of claim 1, wherein the processing circuitry is further configured to toggle between the brightness and color temperature control modes responsive to a double-tap of the touch-sensitive panel or a pressing of the touch-sensitive panel longer than a threshold duration.

3. The lighting controller of claim 1, wherein to visually indicate which of the brightness control mode and the color temperature control mode is active, the processing circuitry is configured to:

responsive to one of the brightness and color temperature control modes being active, set a first majority of the series of solid state indicator lights to illuminated and a first remainder of the series of solid state indicator lights to extinguished;

responsive to the other of the brightness and color temperature control modes being active, set a second majority of the series of solid state indicator lights to extinguished and a second remainder of the series of solid state indicator lights to illuminated.

4. The lighting controller of claim 3, wherein the processing circuitry is further configured to select which of the series of solid state indicator lights is included in the first or second remainder of the series of solid state indicator lights to visually indicate the attribute of the light emitted relative to a supported range for the attribute.

5. The lighting controller of claim 1, wherein the touch input is a sliding touch input and to determine the control signal the processing circuitry is configured to determine, within a range of supported configuration values, a configuration value to indicate via the control signal based on a length over which the sliding touch input was received via the touch-sensitive panel.

6. The lighting controller of claim 5, further comprising at least one feedback device communicatively coupled to the processing circuitry, the at least one feedback device comprising a haptic feedback actuator, an audio device, or both;

wherein, to determine the configuration value within the range of supported configuration values, the processing circuitry is configured to:

responsive to the brightness control mode being active, determine a brightness value between minimum and maximum supported brightness values;

responsive to the color temperature control mode being active, determine a color temperature value between minimum and maximum supported warmth values;

wherein the processing circuitry is further configured to, responsive to determining that the configuration value is equal to a value at either end of the range of supported configuration values, provide feedback to the user using the haptic feedback actuator, the audio device, or both.

7. The lighting controller of claim 1, wherein to control the light emitted from the touch-sensitive panel the processing circuitry is configured to control the light emitted from the touch-sensitive panel to indicate both the brightness attribute and the color temperature attribute.

8. The lighting controller of claim 1, wherein the processing circuitry is further configured to, responsive to a user selecting a different lighting fixture to wirelessly control via the touch-sensitive panel, update the light emitted from the touch-sensitive panel to indicate a brightness and color temperature of the different lighting fixture as the different lighting fixture is wirelessly controlled by the lighting controller, wherein the lighting controller is not wired to provide power to the different lighting fixture.

9. A method of controlling solid state lighting, wherein the method is implemented by a lighting controller and comprises:

relaying power from the lighting controller to a solid state lighting fixture wired to the lighting controller;

visually indicating which of a brightness control mode and a color temperature control mode is active via a series of solid state indicator lights of the lighting controller;

interpreting touch input received from the user via a touch-sensitive panel of the lighting controller, based on which of the brightness control mode and the color temperature control mode is active, to determine a control signal for wirelessly controlling an attribute of light emitted by the solid state lighting fixture, the attribute being a brightness attribute or a color temperature attribute;

using the control signal to wirelessly control the attribute of the light emitted by the solid state lighting fixture in accordance with the touch input received from the user via the touch-sensitive panel of the lighting controller; and emitting light from the touch-sensitive panel to illuminate an area around the lighting controller and correspondingly indicate the attribute as the attribute is wirelessly controlled.

10. The method of claim 9, further comprising toggling between the brightness and color temperature control modes responsive to a double-tap of the touch-sensitive panel or a pressing of the touch-sensitive panel longer than a threshold duration.

11. The method of claim 9, wherein visually indicating which of the brightness control mode and the color temperature control mode is active comprises:

responsive to one of the brightness and color temperature control modes being active, setting a first majority of the series of solid state indicator lights to illuminated and a first remainder of the series of solid state indicator lights to extinguished;

responsive to the other of the brightness and color temperature control modes being active, setting a second majority of the series of solid state indicator lights to extinguished and a second remainder of the series of solid state indicator lights to illuminated.

12. The method of claim 11, further comprising selecting which of the series of solid state indicator lights is included in the first or second remainder of the series of solid state indicator lights to visually indicate the attribute of the light emitted relative to a supported range for the attribute.

13. The method of claim 9, wherein the touch input is a sliding touch input and determining the control signal comprises determining, within a range of supported configuration values, a configuration value to indicate via the control signal based on a length over which the sliding touch input was received via the touch-sensitive panel.

14. The method of claim 13:
wherein determining the configuration value within the range of supported configuration values comprises:
responsive to the brightness control mode being active, determining a brightness value between minimum and maximum supported brightness values;
responsive to the color temperature control mode being active, determining a color temperature value between minimum and maximum supported warmth values;
further comprising, responsive to determining that the configuration value is equal to a value at either end of the range of supported configuration values, providing feedback to the user, the feedback comprising haptic feedback, audio feedback, or both.

15. The method of claim 9, wherein emitting light from the touch-sensitive panel comprises emitting light from the touch-sensitive panel to indicate both the brightness attribute and the color temperature attribute.

16. The method of claim 9, further comprising responsive to a user selecting a different lighting fixture to wirelessly control via the touch-sensitive panel, updating the light emitted from the touch-sensitive panel to indicate a brightness and color temperature of the different lighting fixture as the different lighting fixture is wirelessly controlled by the lighting controller, wherein the lighting controller is not wired to provide power to the different lighting fixture.

17. A lighting controller comprising:
power circuitry configured to relay power from the lighting controller to a solid state lighting fixture wired to the lighting controller;
transmitter circuitry configured to wirelessly exchange signals with the solid state lighting fixture;
a touch-sensitive panel configured to emit light and receive touch input from a user;
at least one feedback device comprising a haptic feedback actuator, an audio device, or both;
processing circuitry electrically coupled to the power circuitry, the transmitter circuitry, the at least one feedback device, and the touch-sensitive panel, wherein the processing circuitry is configured to:
interpret the touch input received from the user via the touch-sensitive panel, based on which of a brightness control mode and a color temperature control mode of the lighting controller is active, to determine a control signal for wirelessly controlling an attribute of light emitted by the solid state lighting fixture, the attribute being a brightness attribute or a color temperature attribute and the touch input being a sliding touch input, wherein to determine the control signal the processing circuitry is configured to determine, within a range of supported configuration values, a configuration value to indicate via the control signal based on a length over which the sliding touch input was received via the touch-sensitive panel;
responsive to determining that the configuration value is equal to a value at either end of the range of supported configuration values, provide feedback to the user using the haptic feedback actuator, the audio device, or both;
use the control signal to wirelessly control, via the transmitter circuitry, the attribute of the light emitted by the solid state lighting fixture in accordance with the touch input received via the touch-sensitive panel; and
control the light emitted from the touch-sensitive panel to illuminate an area around the lighting controller and correspondingly indicate the attribute as the attribute is wirelessly controlled;
wherein to determine the configuration value within the range of supported configuration values, the processing circuitry is configured to:
responsive to the brightness control mode being active, determine a brightness value between minimum and maximum supported brightness values;
responsive to the color temperature control mode being active, determine a color temperature value between minimum and maximum supported warmth values.

18. The lighting controller of claim 17, wherein the processing circuitry is further configured to toggle between the brightness and color temperature control modes responsive to a double-tap of the touch-sensitive panel or a pressing of the touch-sensitive panel longer than a threshold duration.

19. The lighting controller of claim 17, wherein to control the light emitted from the touch-sensitive panel the processing circuitry is configured to control the light emitted from the touch-sensitive panel to indicate both the brightness attribute and the color temperature attribute.

20. The lighting controller of claim 17, wherein the processing circuitry is further configured to, responsive to a user selecting a different lighting fixture to wirelessly control via the touch-sensitive panel, update the light emitted from the touch-sensitive panel to indicate a brightness and color temperature of the different lighting fixture as the different lighting fixture is wirelessly controlled by the lighting controller, wherein the lighting controller is not wired to provide power to the different lighting fixture.

21. A method of controlling solid state lighting, wherein the method is implemented by a lighting controller and comprises:
relaying power from the lighting controller to a solid state lighting fixture wired to the lighting controller;
interpreting touch input received from a user via a touch-sensitive panel of the lighting controller, based on which of a brightness control mode and a color temperature control mode of the lighting controller is active, to determine a control signal for wirelessly controlling an attribute of light emitted by the solid state lighting fixture, the attribute being a brightness attribute or a color temperature attribute and the touch input being a sliding touch input, wherein determining the control signal comprises determining, within a range of supported configuration values, a configuration value to indicate via the control signal based on a length over which the sliding touch input was received via the touch-sensitive panel;
responsive to determining that the configuration value is equal to a value at either end of the range of supported configuration values, providing feedback to the user, the feedback comprising haptic feedback, audio feedback, or both;
wirelessly controlling the attribute of the light emitted by the solid state lighting fixture in accordance with touch input received from a user via a touch-sensitive panel of the lighting controller; and
emitting light from the touch-sensitive panel to illuminate an area around the lighting controller and correspondingly indicate the attribute as the attribute is wirelessly controlled;
wherein determining the configuration value within the range of supported configuration values comprises:
responsive to the brightness control mode being active, determining a brightness value between minimum and maximum supported brightness values;

responsive to the color temperature control mode being active, determining a color temperature value between minimum and maximum supported warmth values.

22. The method of claim 21, further comprising toggling between the brightness and color temperature control modes responsive to a double-tap of the touch-sensitive panel or a pressing of the touch-sensitive panel longer than a threshold duration.

23. The method of claim 21, wherein emitting light from the touch-sensitive panel comprises emitting light from the touch-sensitive panel to indicate both the brightness attribute and the color temperature attribute.

24. The method of claim 21, further comprising responsive to a user selecting a different lighting fixture to wirelessly control via the touch-sensitive panel, updating the light emitted from the touch-sensitive panel to indicate a brightness and color temperature of the different lighting fixture as the different lighting fixture is wirelessly controlled by the lighting controller, wherein the lighting controller is not wired to provide power to the different lighting fixture.

* * * * *